(12) United States Patent
Kuesel et al.

(10) Patent No.: US 9,195,443 B2
(45) Date of Patent: *Nov. 24, 2015

(54) PROVIDING PERFORMANCE TUNED VERSIONS OF COMPILED CODE TO A CPU IN A SYSTEM OF HETEROGENEOUS CORES

(75) Inventors: Jamie R. Kuesel, Rochester, MN (US); Mark G. Kupferschmidt, Rochester, MN (US); Paul E. Schardt, Rochester, MN (US); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 13/352,721

(22) Filed: Jan. 18, 2012

(65) Prior Publication Data

US 2013/0185705 A1     Jul. 18, 2013

(51) Int. Cl.
G06F 9/45 (2006.01)
G06F 9/44 (2006.01)
G06F 9/445 (2006.01)
G06F 9/50 (2006.01)

(52) U.S. Cl.
CPC ........ *G06F 8/443* (2013.01); *G06F 8/47* (2013.01); *G06F 9/44521* (2013.01); *G06F 9/44542* (2013.01); *G06F 8/54* (2013.01); *G06F 9/5027* (2013.01)

(58) Field of Classification Search
None
See application file for complete search history.

(56) References Cited

U.S. PATENT DOCUMENTS

| | | | |
|---|---|---|---|
| 5,815,715 A | 9/1998 | Kucukcakar | |
| 6,077,315 A * | 6/2000 | Greenbaum et al. | 717/157 |
| 6,247,174 B1 | 6/2001 | Santhanam et al. | |
| 6,473,897 B1 | 10/2002 | Ansari et al. | |
| 7,363,484 B2 * | 4/2008 | Davis et al. | 713/100 |
| 7,519,800 B2 * | 4/2009 | Michaelis | 713/1 |
| 7,757,225 B2 * | 7/2010 | Copeland et al. | 717/163 |

(Continued)

FOREIGN PATENT DOCUMENTS

| | | |
|---|---|---|
| CN | 1783012 A | 6/2006 |
| WO | 2010149949 A2 | 12/2010 |

OTHER PUBLICATIONS

Kircherer, M., et al., "Seamlessly Portable Applications: Managing the Diversity of Modern Heterogeneous Systems," ACM Transactions on Architecture and Code Optimization, vol. 8, No. 4, Article 42 [online], Jan. 2012 [retrieved Jun. 25, 2015], Retrieved from Internet: <URL: http://dl.acm.org/citation.cfm?id=2086721>, pp. 42:1-42:20.*

*Primary Examiner* — Todd Aguilera
(74) *Attorney, Agent, or Firm* — Patterson & Sheridan, LLP

(57) ABSTRACT

A compiler may optimize source code and any referenced libraries to execute on a plurality of different processor architecture implementations. For example, if a compute node has three different types of processors with three different architecture implementations, the compiler may compile the source code and generate three versions of object code where each version is optimized for one of the three different processor types. After compiling the source code, the resultant executable code may contain the necessary information for selecting between the three versions. For example, when a program loader assigns the executable code to the processor, the system determines the processor's type and ensures only the optimized version that corresponds to that type is executed. Thus, the operating system is free to assign the executable code to any of the different types of processors.

6 Claims, 6 Drawing Sheets

(56) References Cited

U.S. PATENT DOCUMENTS

| | | | |
|---|---|---|---|
| 7,941,791 B2* | 5/2011 | Wang et al. | 717/140 |
| 8,117,604 B2* | 2/2012 | Archambault et al. | 717/147 |
| 8,510,725 B2* | 8/2013 | Frost | 717/139 |
| 8,671,418 B2* | 3/2014 | Barsness et al. | 719/331 |
| 8,776,035 B2* | 7/2014 | Kuesel et al. | 717/152 |
| 2003/0046673 A1* | 3/2003 | Copeland et al. | 717/163 |
| 2004/0083462 A1 | 4/2004 | Gschwind et al. | |
| 2004/0193861 A1* | 9/2004 | Michaelis | 713/1 |
| 2005/0060531 A1* | 3/2005 | Davis et al. | 713/2 |
| 2005/0071828 A1* | 3/2005 | Brokenshire et al. | 717/147 |
| 2005/0081184 A1 | 4/2005 | Deedwaniya et al. | |
| 2006/0026578 A1 | 2/2006 | Ramchandran et al. | |
| 2007/0226722 A1 | 9/2007 | Chou | |
| 2007/0283337 A1* | 12/2007 | Kasahara et al. | 717/149 |
| 2008/0028383 A1* | 1/2008 | Archambault et al. | 717/157 |
| 2008/0034361 A1* | 2/2008 | Ansari et al. | 717/154 |
| 2008/0163183 A1* | 7/2008 | Li et al. | 717/149 |
| 2008/0256330 A1 | 10/2008 | Wang et al. | |
| 2009/0064095 A1* | 3/2009 | Wallach et al. | 717/106 |
| 2009/0119652 A1* | 5/2009 | O'Brien et al. | 717/149 |
| 2009/0158248 A1* | 6/2009 | Linderman et al. | 717/106 |
| 2010/0153934 A1* | 6/2010 | Lachner | 717/146 |
| 2010/0199268 A1* | 8/2010 | Frost | 717/139 |
| 2010/0205619 A1* | 8/2010 | Barsness et al. | 719/331 |
| 2010/0313079 A1 | 12/2010 | Beretta et al. | |
| 2010/0313189 A1 | 12/2010 | Beretta et al. | |
| 2011/0276954 A1 | 11/2011 | Fontenot et al. | |
| 2013/0185704 A1 | 7/2013 | Kuesel et al. | |
| 2013/0185705 A1 | 7/2013 | Kuesel et al. | |

* cited by examiner

PROVIDING PERFORMANCE TUNED VERSIONS OF COMPILED CODE TO A CPU IN A SYSTEM OF HETEROGENEOUS CORES

BACKGROUND

1. Field of the Invention

The present invention generally relates to optimizing code based on a plurality of different processor architecture implementations, or, more specifically, to selecting the executable code that is optimized for a specific processor's architecture implementation.

2. Description of Related Art

Source code (i.e., text written using the format and syntax of a programming language) may be compiled such that is optimized to execute on a particular processor. For example, the processor may have a particular functional unit that the executable code can use advantageously. However, if the executable code that is optimized for the particular processor architecture implementation is executed on a processor with a different architecture implementation, the performance of the executable code may suffer.

SUMMARY

Embodiments of the invention provide a method, system and computer program product for selecting optimized code to be executed in a computing system comprising a first processor and a second processor.

In one embodiment, the method and computer program product comprising loading executable code to be executed by one of the first and second processors where the executable code is based on computer readable code and where at least a portion of the computer readable code is optimized by a compiler to generate both a first compiled code portion based on an architecture implementation of the first processor and a second compiled code portion based on an architecture implementation of the second processor. Further, the respective architecture implementations of the first and second processors are different. Upon determining that the executable code is assigned to the first processor, the method and computer program product comprising executing the first compiled code portion and not the second compiled code portion on the first processor. Upon determining that the executable code is assigned to the second processor, the method and computer program product comprising executing the second compiled code portion and not the first compiled code portion on the second processor.

In another embodiment, the system comprises a first processor and second processor where respective architecture implementations of the first and second processors are different. The system comprising a loader configured to load executable code to be executed by one of the first and second processors, wherein the executable code is based on computer readable code. At least a portion of the computer readable code is optimized by a compiler to generate both a first compiled code portion based on an architecture implementation of the first processor and a second compiled code portion based on an architecture implementation of the second processor. Upon determining that the executable code is assigned to the first processor, the first processor executing the first compiled code portion and not the second compiled code portion. Upon determining that the executable code is assigned to the second processor, the second processor executing the second compiled code portion and not the first compiled code portion.

In another embodiment, a method of compiling computer readable code to be executed in a computing system comprising a first processor and a second processor, comprises optimizing at least a portion of the computer readable code to generate a first compiled code portion based on an architecture implementation of the first processor. The method comprises optimizing the portion of the computer readable code to generate a second compiled code portion based on an architecture implementation of the second processor of the plurality of processors, where the respective architecture implementations of the first and second processors are different. The method comprises generating, by operation of one or more computer processors, executable code based on the computer readable code that comprises one of: (i) the first and second compiled code portion and (ii) at least one reference to the first and second compiled code portion.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
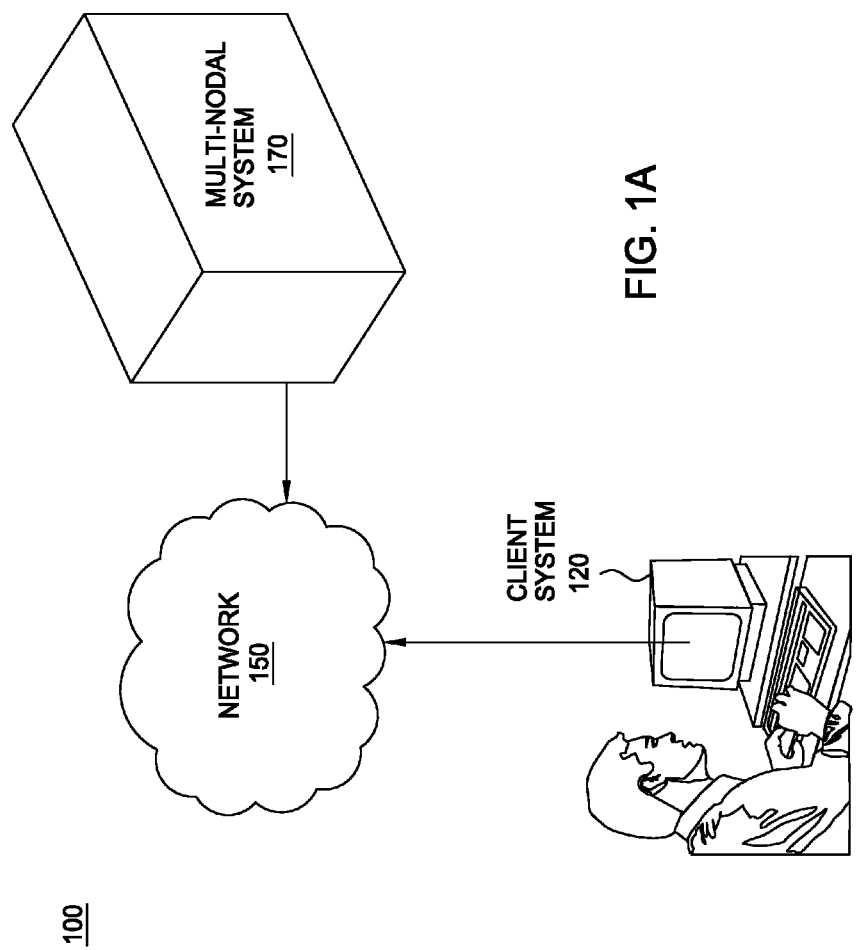
FIGS. 1A-1B are block diagrams illustrating a networked system for performing client submitted jobs on a multi-nodal system, according to embodiments of the invention.

Parallel computing systems typically include a plurality of compute nodes that contain one or more computer processors. In some cases, the computer processors are uniform—i.e., share the same architecture implementation. A compiler may optimize source code to execute on the shared processor architecture implementation. These computing systems may then assign the compiled code to a processor that is, for example, the least busy. Accordingly, regardless of which computer processor is chosen to execute the compiled source code, the code is optimized for the architecture implementation of the computer processor. However, other computing systems may have compute nodes that contain processors that have a variety of different architecture implementations. Moreover, these computing systems may also assign executable code to a processor based on which processor is the least busy. Thus, if the code was optimized for a specific processor but assigned to a processor with a different architecture implementation because it has the most CPU processing power available, the code may perform worse than if it had not been optimized at all. One solution is to force the executable code to execute on the processor it is optimized for; however, if that processor is busy, this may cause the performance of the computing system to suffer.

Instead, a compiler may optimize the code to be run on two or more different architecture implementations. For example, if a compute node has three different types of processors (i.e., three different processor architecture implementations) the compiler may be configured to optimize source code to execute on the three different types. That is, after compiling the source code, the resultant executable may contain the necessary information to execute code optimized for all three different processor architecture implementations. When a program loader assigns the executable to the processor, the system determines the processor's type and ensures that only the optimized code corresponding to that type is executed. Thus, the loader is free to assign the executable code to any processor based on, for example, the performance or status of the processor (e.g., whether it has available CPU processing power) and still enjoy the benefits of executing code that is optimized for the processor.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
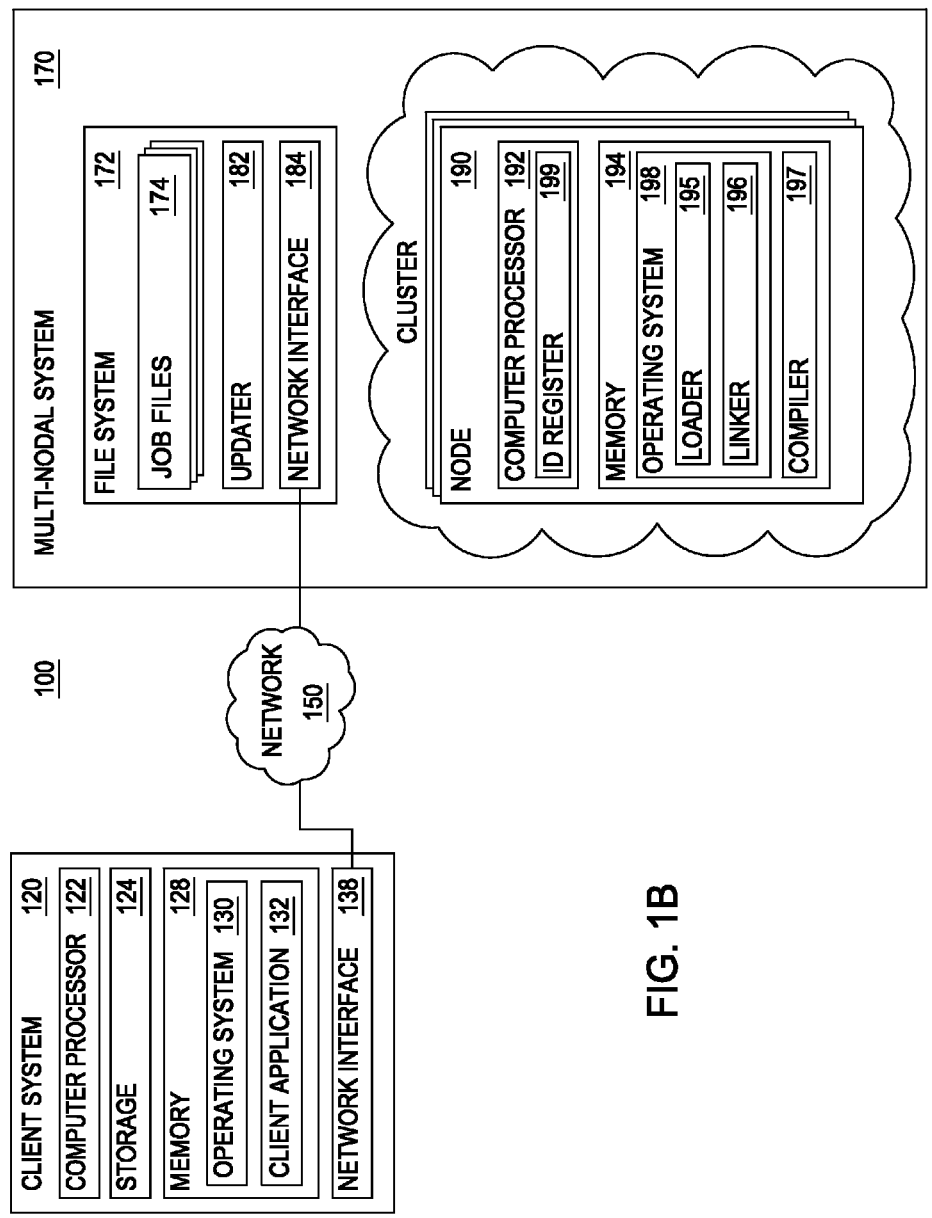

FIGS. 1A-1B are block diagrams illustrating a networked system for performing client submitted jobs on a multi-nodal system, according to embodiments of the invention. As shown, FIG. 1A is a block diagram illustrating a networked system for performing client submitted jobs on a multi-nodal system. In the depicted embodiment, the system 100 includes a client system 120 and a multi-nodal system 170, connected by a network 150. Generally, the client system 120 submits jobs over the network 150 to a file system running on the multi-nodal system 170. Nonetheless, any requesting entity may transmit jobs to the multi-nodal system 170. For example, software applications (such as an application running on the client system 120), operating systems, sub-systems, other multi-nodal systems 170 and, at the highest level, users may submit jobs. The term "job" denotes a set of commands for requesting resources from the multi-nodal system 170 and using these resources. Any programming language such as JAVA®, Smalltalk, C++, C or the like may be implemented to format the set of commands. Additionally, a multi-nodal system 170 may implement a unique programming language or provide a particular template. These jobs may be predefined (i.e., hard coded as part of an application) or may be generated in response to input (e.g., user input). Upon receiving the job, the multi-nodal system 170 executes the request and then returns the result.

FIG. 1B is a block diagram of a networked computer system configured to perform client submitted jobs on a multi-nodal system, according to one embodiment of the invention. As shown, the system 100 contains a client system 120 and a multi-nodal system 170. The client system 120 contains a computer processor 122, storage media 124, memory 128 and a network interface 138. The computer processor 122 may be any processor capable of performing the functions described herein. The client system 120 may connect to the network 150 using the network interface 138. Furthermore, as will be understood by one of ordinary skill in the art, any computer system capable of performing the functions described herein may be used.

In the pictured embodiment, memory 128 contains an operating system 130 and a client application 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The client application 132 is generally capable of generating job requests. Once the client application 132 generates a job, the job may be submitted over the network 150 to file system 172 for execution. The operating system 130 may be any operating system capable of performing the functions described herein.

The multi-nodal system 170 contains a file system 172 and at least one node 190. Each job file 174 contains the necessary information for the nodes 190 to complete a submitted job. The updater 182 maintains a record of which job files are pending, i.e., being performed by a node 190. The network interface 184 connects to the network 150 and receives the job files 174 sent from the client system 120. Furthermore, as will be understood by one of ordinary skill in the art, any computer system capable of performing the functions described herein may be used.

In one embodiment, the job file 174 may include source code written in a programming language (e.g., C++, C, assembly language, and the like) or executable code (e.g., object code or machine code).

The nodes 190 contain a computer processors 192 and memory 194. The computer processors 192 may be any processor capable of performing the functions described herein.

As used herein a "processor" includes at least one execution unit that processes instructions found in executable code. Accordingly, each core within a multi-core processor may be considered as a separate processor.

The computer processors 192 may be subdivided into different processor types where each type has a distinct architecture implementation. Each processor type may be distinguished by, for example, single thread performance, throughput capabilities, message handling, auxiliary floating point units, vector units, floating point units, and the like. Thus, as used herein, processors that have "different architecture implementations" may still utilize the same Instruction Set Architecture (x86, POWERPC®, etc.) but have different functional units or a different arrangement of those hardware units.

In one embodiment, although the architecture implementations of two or more of the computer processors 192 are different, the processors 192 are software compatible. That is, the architecture implementations are similar enough that any executable code that can execute on one of the processors 192 can also execute on any other of the computer processors 192, even if that code was specifically optimized for one of the architecture implementations. However, the performance of the multi-nodal system 170 or the code may vary based on the processor 192 assigned to execute the code. For example, the processor 192 may have a microcode engine to handle certain instructions in the ISA. It may do this in order to maintain ISA compatibility without dedicating excessive hardware resource for the performance benefit the instruction provides. If so, usage of that instruction may suffer performance wise relative to avoiding the instruction and inserting an instruction stream similar to what the microcode engine would have used. This would allow the processor to avoid any overhead associated with the microcode engine. Nonetheless, a processor core that does not microcode these instructions but is software compatible with the accelerated core can also execute object code that was optimized to take advantage of the microcode engine in the accelerated core. Thus, the compute node is able to assign the executable code to any of the computer processors 192 in the compute node 190 that are software compatible.

The memory 194 contains an operating system 198 and a compiler 197. The memory 194 may include both the cache memory located within the processor 192 as well as one or more memory devices having blocks of memory associated with physical addresses, such as random access memory (RAM), read only memory (ROM), flash memory or other types of volatile and/or non-volatile memory.

The operating system 198 includes a loader 195 and a linker 196 and may be any operating system capable of performing the functions described herein. The loader 195 is responsible for loading programs (i.e., executables) into memory and preparing them for execution. Loading a program involves reading the contents of an executable which contains the executable code into memory 194, and carrying out any other required preparatory tasks to prepare the executable code. Once the loader 195 has performed its function, the operating system 198 passes control to the loaded executable code.

In one embodiment, the loader 195 may determine the processor type that will be executing the executable code. For example, the loader 195 may read the identification number stored in the ID register 199 on the computer processor 192. That is, each processor (or processing core) 192 may have an ID that the loader 195 can use to identify the processor's architecture implementation, and thus, its type. Upon determining the processor's type, the loader 195 ensures that the executable code optimized for that type of processor is executed.

The linker 196 may be used for programs that are dynamically linked to libraries. To preserve memory space and to reduce the size of the executables, the executable code may contain references to code that is stored in one or more libraries. At runtime, i.e., after the executable code is assigned to a particular processor, the linker 196 resolves the references and brings into memory the required libraries. The linker 196 may also determine the type of the processor 192 to ensure that the correct optimized code is executed by the processor 192. The functions of the loader 195 and linker 196 will be discussed in more detail later.

The compiler 197 is configured to optimize source code such that the resultant executable (or file) is configured to run code that is optimized for at least two different processor types in the multi-nodal system 170. For example, if the executable code is statically linked (i.e., the executable code is self-contained such that it does not include references to libraries that need to be resolved at runtime) the compiler 197 generates a separate version of one or more subroutines in the optimized code for each of the processor types. Thus, if the node 190 has three different types of processors, the compiler 197 generates an executable that has the necessary information to execute the correct version of the executable code for the three different types.

Although the compiler 197 is shown in the multi-nodal system 170, in one embodiment the client system 120 (e.g., the client applications 132) may have a compiler which has the functions described herein. Thus, when a job file 174 is submitted to the system 170, the source code may have been previously compiled.

Moreover, in one embodiment, the processors 192 of the multi-nodal systems 170 may be configured to execute one or more threads on one or more pipelines. Thus, each thread may be a separate executable that is generated by the compiler 197. The executables may be part of a larger job that is submitted to the multi-nodal system 170 which allows the system 170 to perform the executables, and thus, the job, in parallel. In other embodiments, the same methodology may be applied to a compute system that generates executable work streams that are executed in parallel on a plurality of processors.

Figure 2:
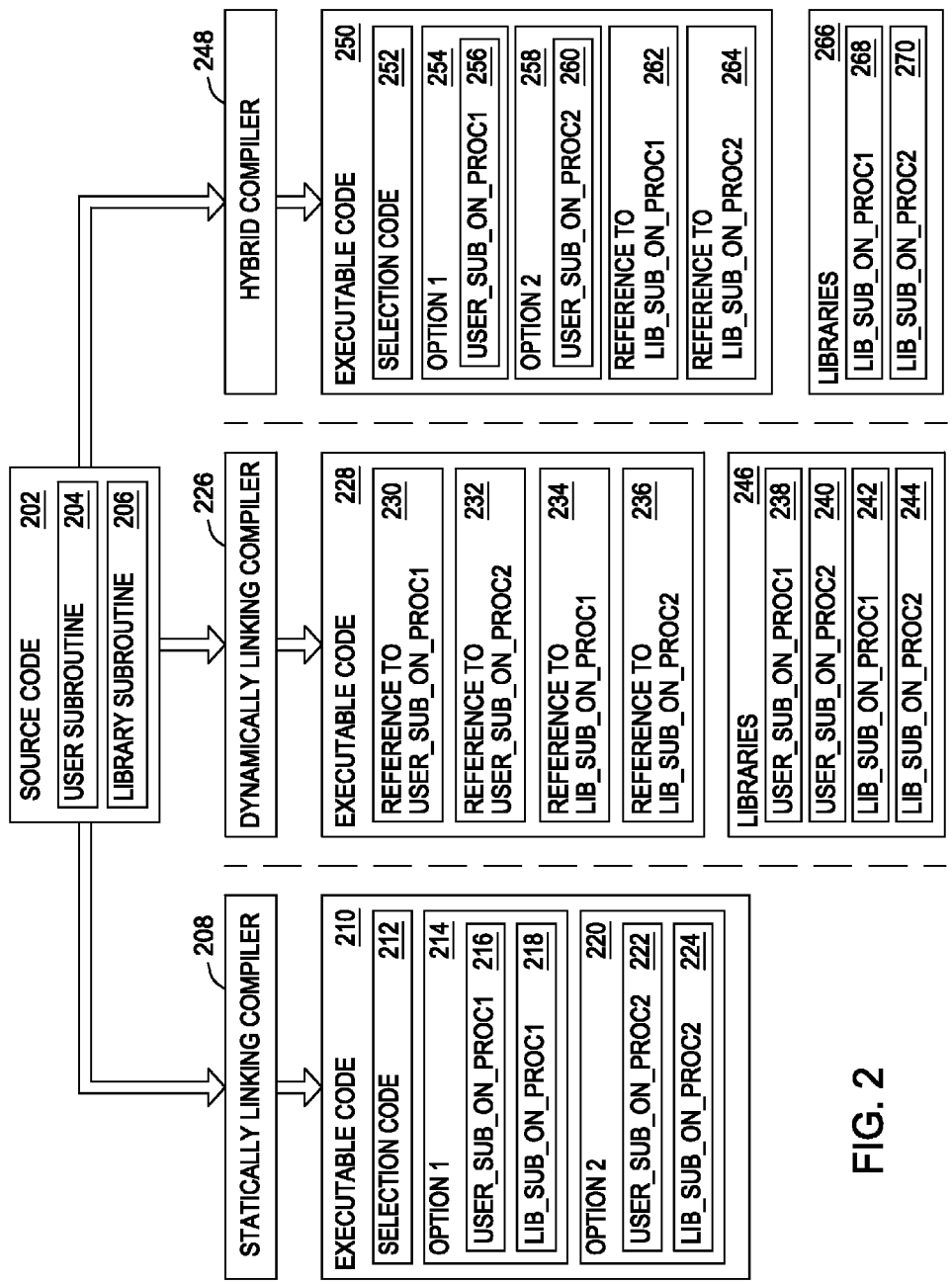
FIG. 2 is a diagram illustrating compiling code that is optimized for a plurality of processors, according to one embodiment of the invention.

FIG. 2 is a diagram illustrating compiling code that is optimized for a plurality of processors, according to one embodiment of the invention. Source code 202 may be text written to satisfy the formatting requirements of a programming language such as Java, C, C++, and the like. As is typical, the source code 202 may be written to include a one or more subroutines 204, 206. Depending on the programming language, the subroutines 204, 206 may be a procedure, function, routine, method, subprogram, and the like. The embodiments discussed herein disclose optimizing one or more of the subroutines 204 and 206 based on a particular architecture implementation of a processor. For example, a compiler may be configured to optimize only one or two of the subroutines 204, 206 in the source code 202 or, alternatively, all of the subroutines 204, 206. In one embodiment, a user may instruct the compiler which subroutines 204, 206 to optimize for the plurality of processors types in a computing system. Although the embodiments discuss optimizing subroutines, the invention is not limited to such and may be used with programming languages that do not have subroutines or with compilers that optimize the entire source code 202 regardless of the subroutines within.

The user subroutine 204 represents any customized subroutine that may be included in the source code by a programmer. A user subroutine 204 may also be a reference or call to another related file that includes source code. In contrast, the library subroutine 206 represents calls in the source code 202 to subroutines that are found in standard or customized libraries. For example, the C programming language includes a standard library—stdio.h—that permits a user to use the printf function (i.e., a subroutine) to display information. Including a library subroutine 206 in the source code 202 allows the programmer to use the functionality of the subroutine without having to include all of the accompanying source code. Before or during the execution of the compiled source code (i.e., the executable) a compiler or linker brings in the necessary executable code from the library to perform the library subroutine 206.

In one embodiment, the source code 202 may be compiled such that it is statically linked. As known in the art, static linking resolves any calls to library subroutines 206 (or other external subroutine and variable calls) at compile time. Thus, the compiler (or linker or binder) produces stand-alone executable code (i.e., object code within an executable) that does not include any reference to libraries. Accordingly, when the executable code is executed by a processor, the application can be certain that all its libraries are present and are in the correct version. This may also avoid dependency problems.

For example, source code 202 may be compiled by a statically linking compiler 208. The statically linking compiler 208 resolves any references in the source code to external subroutines (e.g., library subroutines 206) to create self-contained executable code 210 (i.e., an executable or a portion of an executable). That is, the compiler 208 uses the source code 202 and the referenced libraries (not shown) to generate the executable code 210 that may be executed by a plurality of processors 192 in the multi-nodal system 170 without the need to resolve references at runtime.

As shown in FIG. 2, the executable code 210 contains two options 214, 220 that respectively correspond to two different types of processors that may execute the code 210. Each option 214, 220 contains code that is optimized to run on a particular architecture implementation of a processor. Here, option 214 includes executable code optimized for processor 1 while option 220 includes executable code optimized for processor 2. Specifically, option 214 includes executable code for running the user subroutine 204 on processor 1 (i.e., user_sub_on_proc 1 216) and executable code for running the library subroutine 206 on processor 1 (i.e., lib_sub_on_proc 1 218). The compiler 208 generates these executable code portions using the source code of user subroutine 204 and library subroutine 206, respectively. The executable code portions are optimized specifically for processor 1. Using the same source code 202 and libraries, the compiler 208 also generates a different version of executable code that is optimized for processor 2—i.e., option 220. This option 220 includes executable code for running the user subroutine 204 on processor 2 (i.e., user_sub_on_proc2 222) and executable code for running the library subroutine 206 on processor 2 (i.e., lib_sub_on_proc2 224).

In one embodiment, the compiler 208 inserts into the executable code 210 selection code 212 that provides instructions to the processor to select the appropriate option to execute. Specifically, the selection code 212 does not correspond to any portion of the source code 202 but rather was introduced by the compiler 208 to provide the code 210 with the ability to choose between option 214 and 220. In this manner, the ability of the executable code 210 to select between optimized code portions is transparent to the programmer who generated the source code 202.

The selection code 210 comprises of executable code configured to detect the type of processor which is running the executable code 210 and then select the option 214, 220 to execute based on the indentified processor type. For example, after a loader moves the executable code 210 into main memory and the operating system hands control of the processor to the executable code 210, the selection code 212 is executed by the processor. During execution, the selection code 212 may access the ID register, and based on the processor's ID, determine the architecture implementation (and type) of the processor. The selection code 210 then instructs the processor to execute the correct option 214, 220. If the processor is processor 1, then the executable code contained within option 214 is executed while the executable code contained within option 220 is not. The opposite is also true.

Alternatively, the executable code 210 may not include the selection code 210 and instead the loader may determine what option 214, 220 to execute. That is, the loader uses the ID register to identify the architecture implementation and type of the processor to which the executable code 210 is assigned and instructs the processor where to begin executing the code 210—i.e., execute either option 214 or execute option 220. In this manner, the operating system determines which option 214, 220 to execute rather than the executable code 210 containing the logic to perform the analysis.

In one embodiment, a dynamically linking compiler 226 may be used to optimize and compile that source code 202, referenced libraries, and calls to external functions or variables. Instead of generating self-contained executables, the compiler 226 generates executable code 228 (i.e., an executable or portion of an executable) that includes references (i.e., links or symbols) to standard libraries or user created libraries. In an effort to reduce the size of executables, many programming languages permit code to be compiled without having all the necessary executable code within the executable. Instead, the compiler insert references that are later resolved during runtime. These references may be memory addresses or file paths to the library which contains the executable code.

As shown, executable code 228 has four references that each link to different versions of executable code for the different processor architecture implementations that may be found in the multi-nodal system 170. The reference 230 to user subroutine for processor 1 links to the user_sub_proc1 library 238 which contains the executable code associated with user subroutine 204 that is optimized to run on processor 1. The reference 232 to user subroutine for processor 2 links to the user_sub_proc2 library 240. The references 234 and 236 to library subroutines for processor 1 and processor 2 link to lib_sub_proc1 242 and lib_sub_proc2 244, respectively. Thus, before the executable code 228 is executed by a processor, the references must be resolved—i.e., the processor needs a way of finding the executable code found in the libraries 246.

Although FIG. 2 shows inserting a separate reference in the executable code 226 for each compiled version of the user or library subroutines 204, 206, in one embodiment, the compiler 197 may only insert a single generic reference that represents all of the different versions of a subroutine. This generic reference may point to one or more libraries where the versions are stored. After the executable code 228 is assigned to a processor, the linker may identify the assigned processor's architecture implementation and parse through the one or more libraries represented by the generic reference to find the library (or portion of a library) that contains the version of the subroutine that corresponds to that architecture implementation. The linker may load only that relevant library into memory and exclude the other libraries that were linked by the generic reference. Then the linker may resolve the reference by inserting the memory address to the relevant library in memory.

The libraries 246 may include standard libraries for the chosen programming language (e.g., the printf function in the C programming language) or libraries that are generated based on user subroutines 204 found in the source code 202. The lib_sub_proc1 242 and lib_sub_proc2 244 may be standard libraries that include executable code for performing the library subroutine 206. That is, the standard libraries may include executable code that was previously compiled. Alternatively or additionally, the compiler 226 may create a library based on the user subroutine 204. To reduce the size of the executable code 228, the compiler 226 may create a separate library for each of the different executable versions of the optimized user subroutine 204—i.e., user_sub_proc 1 library 238 and user_sub_proc2 library 240. The compiler 228 then includes in the executable code 228 references to these user libraries.

Once the executable code 228 is assigned to a processor, the linker resolves the references 230, 232, 234, and 236. In this embodiment, the linker is a dynamic linker that allows the system to postpone resolving the references 230, 232, 234, and 236 until the executable code 228 is assigned for execution. Before or during the execution of the executable code 228, the linker uses the references 230, 232, 234, and 236 to locate the associated library and load that library into memory. The references are resolved by ensuring the processor has the information necessary to locate the associated libraries 246 in memory.

Moreover, the linker may use the ID register to determine the architecture type of the processor. With this knowledge, the linker can selectively choose the libraries 246 to bring into memory, thereby leaving the other libraries in storage (i.e., a hard drive). For example, if the linker determines that processor is processor 2, the linker moves only the user_sub_proc2 library 240 and the lib_sub_proc2 library 244 into main memory. In some embodiments, the linker may also resolve the references by changing the references 230, 236 to these libraries within the executable code 228 to point to the memory address of where the libraries are currently stored in memory. Thus, if the processor reaches reference 230 or 236 while running the executable code 228, it can fetch the executable code found in library 240 or 244 from main memory and continue to execute the thread.

Advantageously, dynamically linking may reduce the amount of executable code that is brought into memory 194 when compared to the self-contained executable code 210 formed using static linking.

In one embodiment, a hybrid compiler 248 may be used to optimize and compile that source code 202, referenced libraries, and calls to external functions or variables. The hybrid compiler 250 produces executable code 250 (i.e., an executable or a portion of an executable) using the principles of both static and dynamic linking. The executable code 250 contains different version of optimized executable code—i.e., options 254 and 258—as well as references to libraries that are dynamically resolved after the executable code 250 is assigned to a processor.

The statically linked portion of the executable code 250 includes the selection code 252 and executable code contained with option 254 and option 258. As discussed previously, the selection code 252 instructs the processor to select either the executable code for running the user subroutine on processor 1 (i.e., user_sub_on_proc 1 256) or the executable code for running the user subroutine for processor 2 (i.e., user_sub_on_proc2 260). Alternatively, as discussed previously, the loader 195 may perform the same function by determining the architecture type of the processor 192 and loading the correct version of the optimized code.

The dynamically linked portion of the executable code 250 includes the references 262 and 264 which link to the libraries 266. Before or during execution, the linker 196 may resolve the references 262, 264 and load into memory the correct standard library—i.e., either lib_sub_proc 1 268 or lib_sub_proc2 270. Note that the same process may be done for customized user libraries as well.

Note that the executable code 210, 228 or 250 may contain code that is not specifically optimized for a specific processor. For example, one of the user subroutines 204 in the source code 202 may not be optimized for a particular architecture implementation. Thus, a compiler would not need to generate two different versions of executable code for the subroutine if the executable code was statically linked. Instead, the compile would generate only one version of executable code based on the user subroutine. This version may be stored directly in the executable code 210, 228, 250. Similarly, if the non-optimized subroutine was dynamically linked, a compiler would need to insert only one reference to the external library that contains the executable code for that subroutine. The reference may provide a link to only a single library (or portion of a library) that contains the non-optimized executable code.

Figure 3:
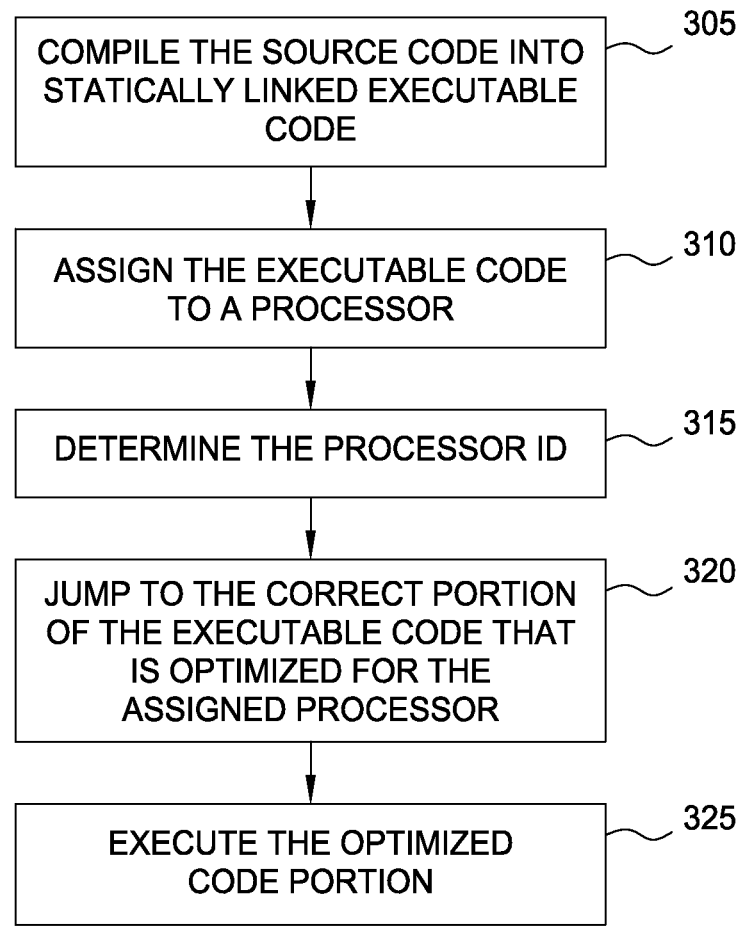
FIG. 3 is a flow chart for executing optimized code that is statically linked in the system of FIGS. 1A-1B, according to one embodiment of the invention.

FIG. 3 is a flow chart for executing optimized code that is statically linked in the system of FIGS. 1A-1B, according to one embodiment of the invention. At step 305, the compiler 197 may generate, using static linking, an executable that contains self-contained executable code that is optimized for a plurality of different processor architecture implementations. Thus, in one embodiment, the executable contains different versions of optimized, compiled code that correspond to the same source code. For compilers that optimize one or more subroutines within the source code, the resulting executable code contains at least two different versions of executable code for the subroutine.

Moreover, the compiler 197 resolves any references or calls to a library or other external function. This requires the compiler 197 to bring in the referenced code into the self-contained executable. That is, in one embodiment, the compiler 197 combines the code from the library or external function with the source code and compiles the code to form an executable. If the code from the library or external has been compiled previously, the compiler 197 may insert this executable code into the executable. When the compiler 197 is finished linking the source code using the references, the resulting executable does not need to access a library or external function in order to execute.

At step 310, the operating system 198 may instruct the loader 195 to assign the executable to a specific processor 192 on the compute node 190. As mentioned previously, the executable may be a thread that represents a portion of a job that was submitted to the multi-nodal system 170. The operating system 198 may instruct the loader 195 to assign the executable to the processor 192 that currently has, for example, the greatest amount of CPU processing power available.

At step 315, the loader 195 or the executable code itself may determine which version of the optimized subroutine to execute. In one embodiment, the compiler 197 may generate and insert selection code into the executable code. The selection code is generated by the compiler 197 to select between the different executable versions of the optimized subroutine.

As the selection code is executed, it determines the processor ID by accessing, for example, the ID register 199 and selects the version of the code that is optimized for that processor's architecture implementation. The other versions are not executed by the processor 192. Alternatively, the loader 195 may determine the correct version and ensure that the processor executes only that version of the optimized function. However, in either embodiment, the correct optimized code is selected without requiring any intervention from a system administrator or programmer.

At step 320, the processor 192 jumps to the correct portion of the executable code that is optimized for the assigned processor. At step 325, the processor 192 executes the code portion that is optimized for the particular architecture implementation of the processor 192. Specifically, the other code portions that are optimized for different architecture implementations are not executed. However, the executable code may contain other code portions that are executed that were not optimized for any particular processor architecture implementation. For example, the compiler 197 may only optimize the subroutines that reference subroutines found in standard libraries while the user subroutines are not optimized. Moreover, the system may have default versions of subroutines that are used in the executable in the absence of implementation of specific versions. Accordingly, the non-optimized user subroutines may not have different compiled versions within the executable code.

Figure 4:
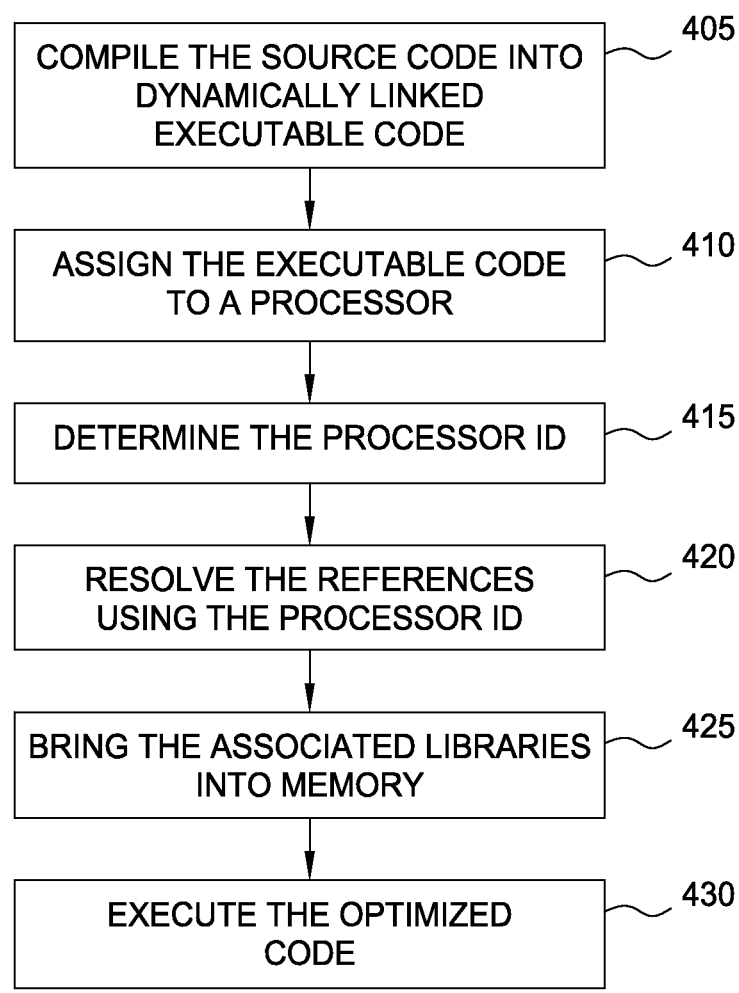
FIG. 4 is a flow chart for executing optimized code that is dynamically or statically linked in the system of FIGS. 1A-1B, according to one embodiment of the invention.

FIG. 4 is a flow chart for executing optimized code that is dynamically or statically linked in the system of FIGS. 1A-1B, according to one embodiment of the invention. At step 405, the compiler 197 generates an executable that is dynamically linked to one or more libraries. As mentioned previously, the compiler 197 may insert references (i.e., symbols or links) into the executable that refer to a standard or user library. Furthermore, the compiler 197 may insert links to each of the different versions of the library that contain the optimized code. Alternatively, the compiler 197 may insert a generic link to one or more libraries that contain the different versions of the optimized function.

Moreover, the compiler 197 may generate statically linked portions within the executable that contain different executable versions of a subroutine. The correct version of the subroutine found within the executable code may be selected after the executable code is assigned to a processor (i.e., during runtime).

At step 410, the operating system 198 may instruct the loader 195 to assign the executable to a specific processor 192 on the compute node 190. As mentioned previously, the executable may be a thread that represents a portion of a job that was submitted to the multi-nodal system 170. The operating system 198 may instruct the loader 195 to assign the executable to the processor 192 that currently has, for example, the lowest CPU utilization.

At step 415, the statically linked portion of the executable may by selected by using the loader 195 or by using selection code that is inserted into the executable code by the compiler 197 which is discussed in step 315 of FIG. 3. Similarly, the linker 196 may also identify the processor's architecture implementation and dynamically link the executable to the library which contains the optimized version associated with the architecture implementation.

If the compiler 197 inserts a reference into the executable for each optimized version of the subroutine, at step 420, the linker 196 resolves (e.g., inserts a memory address) only the reference that links to the correct optimized version. In another embodiment, if the compiler 197 inserts a generic reference into the executable, the linker 196 may parse the one or more libraries and pull into memory 194, at block 425, only the version of the subroutine that corresponds to the architecture implementation of the assigned processor. The linker 196 may leave the other versions of the subroutine in storage. The linker 196 then resolves the reference to point to the library loaded in memory 194.

At step 430, the assigned processor 192 begins to run the executable code. Once the processor 192 executes object code associated with the resolved reference, the processor 192 can begin to execute the object code found in the library that was loaded into memory 194 by the linker 196.

An Example Configuration of the Multi-Nodal System

Figure 5:
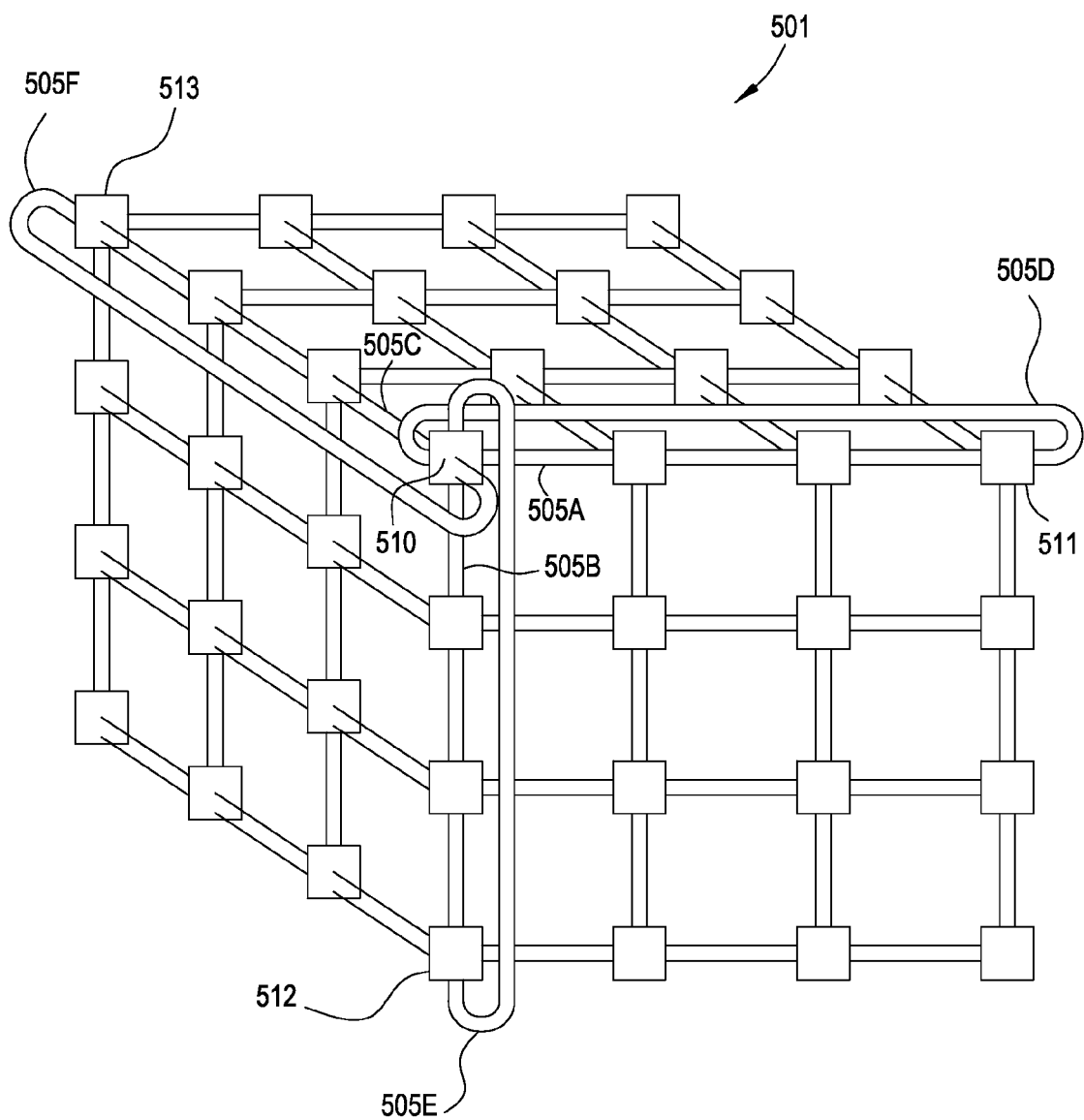
FIG. 5 is a diagram illustrating a multi-nodal job construct, according to embodiments of the invention.

FIG. 5 illustrates a 4×4×4 torus 501 of compute nodes 190, in which the interior nodes are omitted for clarity. Although FIG. 5 shows a 4×4×4 torus having 64 nodes, it will be understood that the actual number of compute nodes in a parallel computing system is typically much larger, for instance, a Blue Gene/L system includes 65,536 compute nodes. Each compute node in the torus 501 includes a set of six node-to-node communication links 501A-F which allow each compute node in the torus 501 to communicate with its six immediate adjacent nodes, two nodes in each of the x, y and z coordinate dimensions. In one embodiment, the multi-nodal system 170 may establish a separate torus network for each job executing in the system 170. Alternatively, all the compute nodes may be connected to form one torus.

As used herein, the term "torus" includes any regular pattern of nodes and inter-nodal data communications paths in more than one dimension such that each node has a defined set of neighbors, and for any given node, it is possible to determine the set of neighbors of that node. A "neighbor" of a given node is any node which is linked to the given node by a direct inter-nodal data communications path—i.e., a path which does not have to traverse through another node. The compute nodes may be linked in a three-dimensional torus 501, as shown in FIG. 5, but may also be configured to have more or fewer dimensions. Also, it is not necessary that a given node's neighbors are the physically closest nodes to the given node, although it is generally desirable to arrange the nodes in such a manner, insofar as possible.

In one embodiment, the compute nodes in any one of the x, y or z dimensions form a torus in that dimension because the point-to-point communication links logically wrap around. For example, this is represented in FIG. 5 by links 505D, 505E and 505F which wrap around from a last node in the x, y and z dimensions to a first node. Thus, although node 510 appears to be at a "corner" of the torus, node-to-node links 505A-F link node 510 to nodes 511, 512 and 513, in the x, y and z dimensions of torus 501.

Conclusion

A compiler may optimize source code and any referenced libraries to execute on a plurality of different processor architecture implementations. For example, if a compute node has three different types of processors with three different architecture implementations, the compiler may compile the source code and generate three versions of object code where each version is optimized for one of the three different processor types. After compiling the source code, the resultant executable code may contain the necessary information for selecting between the three versions. For example, when a program loader assigns the executable code to the processor, the system determines the processor's type and ensures only the optimized version that corresponds to that type is executed. Thus, the operating system is free to assign the executable code to any processor based on, for example, the performance or status of the processor and still enjoy the benefits of executing code that is optimized for whichever processor is assigned the executable code.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product for selecting optimized code to be executed in a computing system comprising a first processor and a second processor, the computer program product comprising:

a non-transitory computer-readable medium having computer-readable program code embodied therewith, the computer-readable program code configured to:

compile a user-defined function included within a client job received by the computing system to create a first compiled code portion and a second compiled code portion, wherein the first compiled code portion is optimized based on an architecture implementation of the first processor and the second compiled code is optimized based on an architecture implementation of the second processor, wherein the respective architecture implementations of the first and second processors are different, and wherein compiling the function comprises:

storing the first and second compiled code portions as first and second libraries;

generating an executable comprising a first reference to the first library, a second reference to the second library, a third code portion optimized for the first processor, a fourth code portion optimized for the second processor, and selection code comprising instructions for selecting between the third and fourth optimized code portions based on a processor ID of a processor to which the executable is assigned, wherein the selection code is introduced into the executable by a compiler and does not correspond to any user-provided source code, and wherein the executable is separate from the first and second libraries;

at execution of the executable, use a linker to select one of the first and second libraries, wherein the linker uses the processor ID to select one of the first and second libraries;

upon determining that the executable is assigned to the first processor, load the first library into memory to be executed by the first processor and not the second library; and upon determining that the executable is assigned to the second processor, load the second library into memory to be executed by the second processor and not the first library.

2. The computer program product of claim 1, wherein determining that the executable is assigned to first or second processor further comprises evaluating a processor ID stored in respective registers on the first and second processors.

3. The computer program product of claim 1, wherein the architecture of the first processor comprises a functional hardware unit that is not included within the architecture implementation of the second processor.

4. A computing system, comprising:

a first processor;

a second processor, wherein respective architecture implementations of the first and second processors are different;

a compiler configured to optimize a user-defined function included within a client job received by the computing system to create a first compiled code portion and a second compiled code portion, wherein the first compiled code portion is based on the architecture implementation of the first processor and the second compiled code portion is based on the architecture implementation of the second processor, wherein the compiler is further configured to store the first and second compiled code portions in first and second libraries and generate an executable comprising a first reference to the first library, a second reference to the second library, a third code portion optimized for the first processor, a fourth code portion optimized for the second processor, and selection code comprising instructions for selecting between the third and fourth optimized code portions based on a processor ID of a processor to which the executable is assigned, wherein the selection code is introduced into the executable by the compiler and does not correspond to any user-provided source code, and wherein the executable is separate from the first and second libraries;

a linker configured to, at execution of the executable, use the processor ID to select one of the first and second libraries;

wherein, upon determining that the executable is assigned to the first processor, the linker loads the first library into memory to be executed by the first processor and not the second library; and wherein, upon determining that the executable code is assigned to the second processor, the linker loads the second library into memory to be executed by the second processor and not the first library.

5. The system of claim 4, wherein determining that the executable is assigned to first or second processor further comprises evaluating a processor ID stored in respective registers on the first and second processors.

6. The system of claim 4, wherein the architecture implementation of the first processor comprises a functional hardware unit that is not included within the architecture implementation of the second processor.

* * * * *